Aug. 9, 1932.  L. E. W. MONTROSE-OSTER  1,871,074
ELECTRIC STREET VEHICLE
Filed May 5, 1930  3 Sheets-Sheet 1
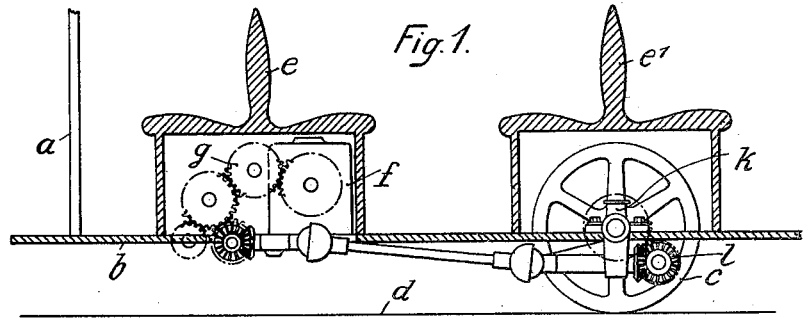
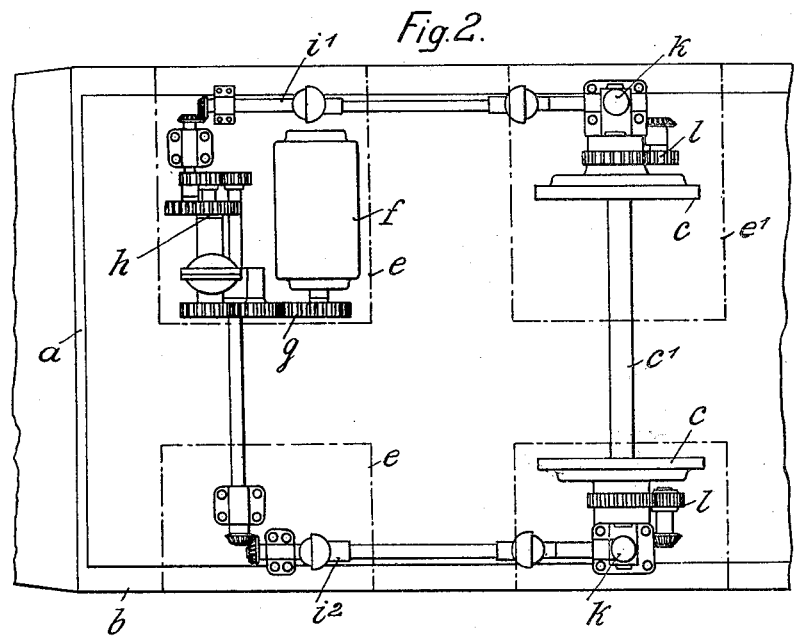
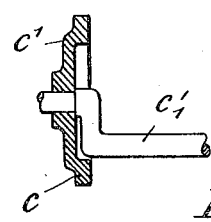
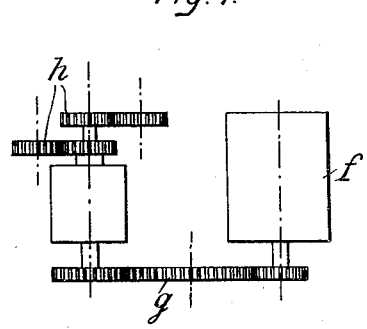
Inventor:
Louis-Eugene-Widolt Montrose-Oster
by C. P. Goepel
his Atty.

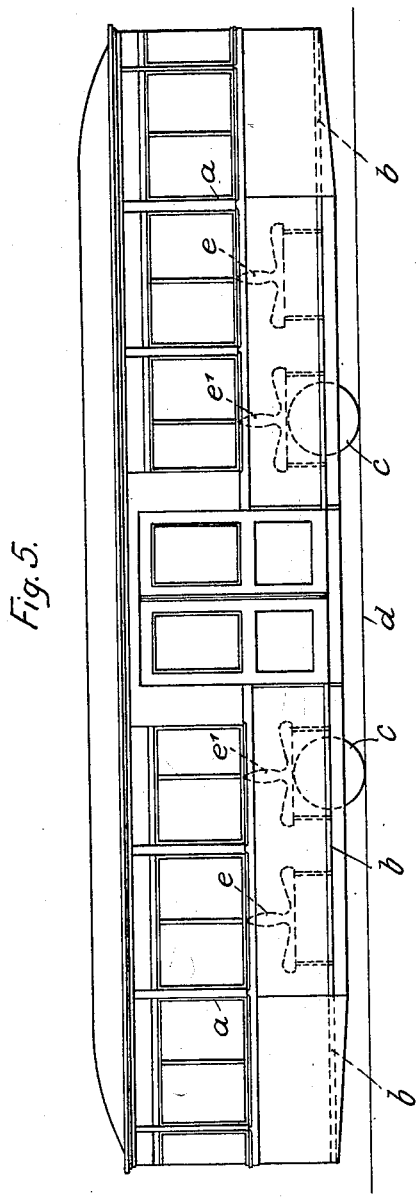

Aug. 9, 1932.　　L. E. W. MONTROSE-OSTER　　1,871,074
ELECTRIC STREET VEHICLE
Filed May 5, 1930　　3 Sheets-Sheet 3
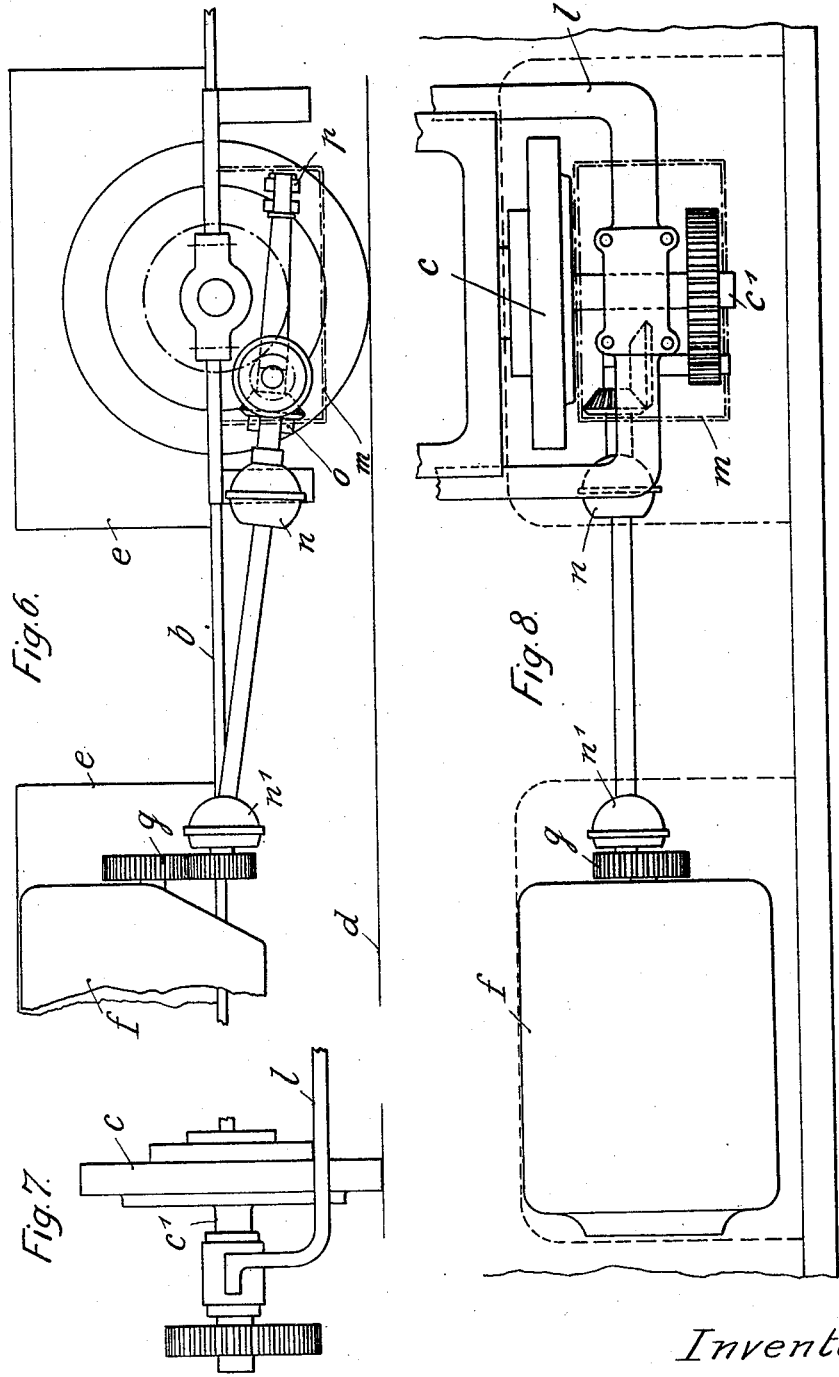
Inventor:
Louis-Eugéne-Widolt Montrose-Oster
by C. P. Goepel
his Atty.

Patented Aug. 9, 1932

1,871,074

UNITED STATES PATENT OFFICE

LOUIS-EUGÉNE-WIDOLT MONTROSE-OSTER, OF CARLSBAD, CZECHOSLOVAKIA, ASSIGNOR TO SUDDEUTSCHE EISENBAHNGESELLSCHAFT, OF ESSEN, GERMANY, A CORPORATION OF GERMANY

ELECTRIC STREET-VEHICLE

Application filed May 5, 1930, Serial No. 449,727, and in Germany May 7, 1929.

This invention relates to electrically operated street-vehicles or street-cars for passenger service, and more particularly to vehicles or cars of the aforementioned kind in which the benches or seats may be arranged either in longitudinal or in transverse direction to the vehicle or car.

My invention has primarily for its object to provide an electrically operated street-vehicle or street-car with a floor which is positioned relatively low, that is very close to the surface of the street, at the same time permitting the use of wheels of normal or essentially normal diameter.

According to my invention the bottom or floor of the car is positioned horizontally at the height of one step above the surface of the street and extends throughout the car. In my new electric street-vehicle or street-car, therefore, the floor is fully free of any steps, arched or inclined surfaces, especially at both ends of the car. By reason of this a street-vehicle constructed according to my invention may, therefore, be properly designated as "low floor car with horizontal bottom throughout" or simply as "low floor car".

I am aware of the fact that street-cars have been constructed with a low floor provided centrally along the car and ascending at both ends thereof. By my invention now—in contra-distinction to this construction—it will be possible to render available the entire bottom or floor surface of a low floor car for the seats for passenger service and to retain highest possible resiliency of the spring suspension which for purposes of passenger service is extremely desirable.

My invention consists in the first place therein, that the driving motor for the street-vehicle or street-car as well as the transmission gear, the differential gear, the members forming part of the Cardan drive, the axles of the wheels and their bearings, and eventually also the transmission gears and other parts of the Cardan drive are provided with horizontally or essentially horizontally positioned axles positioned within the profile of the car-body, and more particularly within the free space intermediate the bottom or floor of the car and the seating surfaces of the benches or rows of benches. Further details of the car construction which forms part of my present invention will be apparent from the drawings and the hereinbelow specification, while the novel features and combinations of parts will be pointed out in the appended claims.

In the drawings I have represented two main forms of construction of my new electrically operated low floor street-vehicle or street-car, Fig. 1 being a partial longitudinal section through a low floor car constructed according to the principles of my invention, Fig. 2 a partial top-view, with some parts broken away, taken on Fig. 1, with the omission of certain unessential parts, Fig. 3 a detail showing the use of wheels mounted on a bent or cranked axle, Fig. 4 a diagram showing the arrangement of the driving elements of my new car, Fig. 5 a somewhat diagrammatical longitudinal view of my new car, Fig. 6 a side-view of a driving gear of modified construction, some details thereof being shown broken away, Fig. 7 a view, as seen from the end of the car, of the driving gear with omission of several details, and Fig. 8 a top-view of the driving gear shown in Fig. 1.

Referring now more particularly to the drawings, according to Figs. 1 and 2 the car-body $a$ is provided with a bottom $b$ adapted to serve as the floor of the car and with a pair of wheels $c$ resting on the surface $d$ of the street. A row of seats or benches $e$ and $e_1$ are provided in the ordinary manner, for instance, with common backs for adjacent seats.

A particular feature of my invention consists therein, that the driving motor $f$ having an horizontal axle together with its transmission gear $g$ and the differential gear as well as the first member of the Cardan drive $i_1, i_2$ are mounted within the free space intermediate the bottom or floor of the car and the bench or surface of a seat, while the wheels $c$, together with their fixed axles $c_1$, the bearings $k$ and the transmission gears $l$ are positioned for the greater part below the seats of another of the row of benches, preferably below the bench which follows the former.

To provide motors having vertical axles below the seats or benches of a car is known in principle, the known constructions of this kind, however, being connected with grave constructional disadvantages.

When constructing the new low floor street-vehicle or street-car according to my present invention it will be preferable to equip the differential gear with a hollow shaft, to incline downward the central part of the Cardan shaft and to use bent or cranked axles for the wheels. As shown in Fig. 3 the cranked part $c'_1$ of the axle in this case is practically positioned within the cavity $c'$ provided within the rim of the wheels $c$.

There will be no difficulty whatever in selecting a proper type of electric motor which is suitable for the low floor street-vehicle or street-car constructed according to the aforementioned principles of my invention. It may be noted that the wheels or wheel trucks need not be constructed and arranged exactly as shown in the drawings, as the experiments which have so far been carried out have proven the fact that it will be possible to use a power transmission mechanism comprising an essentially smaller number of gears, than shown in the drawings. It is likewise not necessary to mount the motor in a one-sided manner with respect to the car, that is on the one end of the latter and to drive from this end of the car the Cardan shafts $i_1$ and $i_2$, the latter by the aid of an intermediate shaft, as shown in the drawings, it being assumed in this case that the same arrangement of motor and power transmission mechanism in the form of an exact image of the motor and power transmission mechanism shown may be used at the other end of the car. On the other hand it will also be possible to drive at a time two wheels, positioned one in the rear of the other, from a single motor. Likewise, it will not be necessary to use bent or cranked axles proper for the wheels, since also axle-stumps may be used with advantage in case a proper gauge (for instance standard gauge) is chosen.

According to my invention it will be possible to construct a street-car which in every respect fulfills all modern requirements of mechanical as well as of electrical nature and which, in addition, will offer the very desirable convenience that the bottom or floor will extend in horizontal direction throughout the length of the car and at a height of a single step above the surface of the street as shown, for instance, in Fig. 5.

While the just-described form of construction of my new low floor car comprises two axles either adjacent or one in the rear of the other and driven from a single motor, according to a further feature of my invention it will be possible to use four motors with horizontal axles, each being slightly inclined and adapted to drive one of the four running wheels of the car by the intermediary of a Cardan drive or universal joint. Figs. 6, 7 and 8 show constructions of this kind.

According to Figs. 6, 7 and 8, more particularly, the motor $f$, eventually together with its transmission-gear $g$, is mounted on the bottom or floor of the car underneath a seat or bench $e$. Rails $d$ may be used and the wheels $c$ in this case are mounted upon axle-stumps $c_1$. The axle frame is designated with $l$, the gear-box with $m$, while $n$ and $n_1$ are Cardan or universal joints and $o$ and $p$ bearings for the driving axle.

From the several figures of the drawings it will be seen that the four motors with horizontally or nearly horizontally positioned axles are mounted underneath the seats or benches, said four motors serving to drive axles which may be positioned underneath successive seats or benches and therewith the wheels connected to said axles. The gear-box in this case may be fixed upon the axle-frame.

The Cardan shafts of which each serves for driving one of the four wheels are mounted on either side of the axle of said wheel. In case of a full spring suspension of the car the clutch which forms part of the Cardan drive is likewise positioned in the free space underneath two seats or benches. This form of construction is not shown in the drawings as it may be easily understood.

This new construction which forms a further part of my invention is connected with the important advantage, that all unnecessary torques will be positively avoided when transmitting the power from the motor or motors to the wheels. This is due to the fact that the bearing for the wheels is positioned in the line of the forces exerted by the power transmission mechanism and that the driving gear is mounted at the outside. In case of a trailer this driving gear may be omitted without necessitating any changes in the construction. In addition, every trailer may in this manner be turned easily and conveniently into a motor-car without making any changes in the construction. At the same time, however, it will be possible, merely by minor changes in the construction, to use my new low floor car or vehicle as a street-vehicle without rails, for instance as a "trolley-bus" or street-car without rails.

In the accompanying drawings I have shown and in the above specification described in detail a preferred form of street-vehicle or street-car constructed according to the principles of my invention. It is to be understood, however, that the specific disclosure is for the purpose of exemplification only and that the scope of my present invention is defined in the following claims in which I have endeavored to distinguish it from the prior art so far as known to me, without, however, relinquishing or abandoning any part or feature thereof.

I claim:

1. An electrically operated vehicle or car for passenger service, comprising wheels of normal size, and a car-body having a low floor positioned approximately at the height of one step above the surface of the street throughout the car-body.

2. In a street-vehicle or street-car, the combination of a car-body having a low floor disposed in a single plane throughout the length and width of the car, with a plurality of benches on said floor, a wheel mounted underneath one of said benches with its center of rotation above the floor line, an electric motor mounted underneath another of said benches, and power transmission mechanism interposed between said motor and said wheel.

3. In a street-vehicle or street-car, the combination of a car-body having a low floor, with a plurality of transverse benches on said floor, a pair of wheels of normal or essentially normal size mounted underneath one of said benches, an electric motor with an horizontal axle, said motor being mounted within the free space intermediate the bottom or floor of said car-body and another of said benches, and power transmission mechanism interposed between said motor and said pair of wheels.

4. In a street-vehicle or street-car, the combination of a car-body having a floor positioned relatively low with respect to the surface of the street, with a plurality of benches on said floor, an electric motor mounted in the free space intermediate said floor and one of said benches, a pair of ground or rail engaging wheels of normal or essentially normal size mounted on fixed axles underneath another of said benches and with their centers above the floor line, and power transmission mechanism interposed between said motor and said pair of wheels.

5. In a street-vehicle or street-car, the combination of a car-body having a low floor, with a plurality of transverse benches on said floor, a pair of wheels of normal or essentially normal size mounted underneath one of said benches, an electric motor with an horizontal axle, said motor being mounted within the free space intermediate the bottom or floor of said car-body and another of said benches, and power transmission mechanism interposed between said motor and said pair of wheels, said power transmission mechanism including a differential gear, a hollow shaft carrying one or more members of said differential gear, a second shaft enclosed by said hollow shaft, said second shaft carrying other members of said differential gear.

6. In a street-vehicle or street-car, the combination of a car-body having a floor positioned relatively low with respect to the surface of the street, with a plurality of benches on said floor, an electric motor mounted in the free space intermediate said floor and one of said benches, a pair of wheels of normal or essentially normal size mounted on a cranked axle underneath another of said benches, and power transmission mechanism interposed between said motor and said pair of wheels.

7. In a street-vehicle or street-car, the combination of a car-body having a floor positioned relatively low along its length and breadth with respect to the surface of the street, with a plurality of benches on said floor, an electric motor mounted in the free space intermediate said floor and one of said benches, a pair of wheels of normal or essentially normal size mounted onto the ends of an axle underneath another of said benches, and power transmission means interposed between said motor and said pair of wheels for driving the same.

8. In a street-vehicle or street-car, the combination of a car-body having a floor positioned relatively low with respect to the surface of the street, with a plurality of benches on said floor, an electric motor mounted in the free space intermediate said floor and one of said benches, a cranked axle mounted on said car-body below said floor, a wheel mounted on either crank of said axle, the cranks of said axle being positioned essentially within cavities formed by the rims of said wheels.

9. In a street-vehicle or street-car the combination of a car-body having a low floor, with a plurality of transverse benches on said floor, a pair of wheels of normal or essentially normal size mounted on cranked axles underneath one of said benches, an electric motor mounted in the free space intermediate the bottom of said car-body and one of said transverse benches, and a double transmission gear interposed between said motor on the one hand and each of said wheels on the other hand.

In testimony whereof I affix my signature.

LOUIS-EUGÈNE-WIDOLT MONTROSE-OSTER.